(12) United States Patent
Ballet et al.

(10) Patent No.: US 11,586,056 B2
(45) Date of Patent: Feb. 21, 2023

(54) SPECTACLE LENS COMPRISING AN ACTIVABLE OPTICAL FILTER AND OPTICAL EQUIPMENT COMPRISING SUCH SPECTACLE LENS

(71) Applicant: Essilor International, Charenton-le-Pont (FR)

(72) Inventors: Jerome Ballet, Charenton-le-Pont (FR); Samuel Archambeau, Charenton-le-Pont (FR); David Escaich, Charenton-le-Pont (FR); Jean-Paul Cano, Charenton-le-Pont (FR); Loic Quere, Charenton-le-Pont (FR); Willy Chaudat, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 248 days.

(21) Appl. No.: 16/757,668

(22) PCT Filed: Oct. 19, 2018

(86) PCT No.: PCT/EP2018/078723
§ 371 (c)(1),
(2) Date: Apr. 20, 2020

(87) PCT Pub. No.: WO2019/081369
PCT Pub. Date: May 2, 2019

(65) Prior Publication Data
US 2020/0249502 A1  Aug. 6, 2020

(30) Foreign Application Priority Data
Oct. 24, 2017  (EP) .................................... 17306462

(51) Int. Cl.
G02C 7/10   (2006.01)
G02C 7/02   (2006.01)
(Continued)

(52) U.S. Cl.
CPC ............. *G02C 7/101* (2013.01); *G02C 7/022* (2013.01); *G02C 7/083* (2013.01); *G02C 7/12* (2013.01);
(Continued)

(58) Field of Classification Search
CPC ........ G02C 7/101; G02C 7/022; G02C 7/083; G02C 7/12; G02C 7/104; G02C 7/105;
(Continued)

(56) References Cited

U.S. PATENT DOCUMENTS 4,923,289 A  5/1990  Demiryont
5,138,481 A  8/1992  Demiryont
(Continued)

FOREIGN PATENT DOCUMENTS

CN  201359663 Y  12/2009
EP  0 363 045 A1  4/1990
(Continued)

OTHER PUBLICATIONS

International Search Report dated Dec. 20, 2018 in PCT/EP2018/078723 filed on Oct. 19, 2018.
(Continued)

*Primary Examiner* — Tuyen Tra
(74) *Attorney, Agent, or Firm* — Oblon, McClelland, Maier & Neustadt, L.L.P.

(57) ABSTRACT

A spectacle lens includes an activable optical filter having at least an electrochromic device and being configured to be actively switched between at least three configurations. In the first configuration, the activable optical filter is uniform. In the second configuration, the activable optical filter attenuates selectively light from a localized light source. In the third configuration, the activable optical filter is uniform. Furthermore, the chromaticity difference ΔChrom between each of the configurations is smaller than or equal to 20.

13 Claims, 4 Drawing Sheets

(51) Int. Cl.
　　　*G02C 7/08*　　　(2006.01)
　　　*G02C 7/12*　　　(2006.01)
　　　*G02F 1/155*　　(2006.01)
(52) U.S. Cl.
　　　CPC .......... *G02F 1/155* (2013.01); *G02F 2201/44* (2013.01)
(58) Field of Classification Search
　　　CPC .. G02F 1/155; G02F 2201/44; G02F 1/13725; G02F 1/157
　　　USPC ............................................ 351/41, 159.01
　　　See application file for complete search history.

(56) References Cited

U.S. PATENT DOCUMENTS

| 2012/0218483 | A1 | 8/2012 | Archambeau et al. |
| 2017/0315384 | A1 | 11/2017 | Saylor et al. |

FOREIGN PATENT DOCUMENTS

| FR | 2 939 916 A1 | 6/2010 |
| JP | 2017-522592 A | 8/2017 |
| WO | WO 2016/021129 A1 | 2/2016 |
| WO | WO 2016/077431 A2 | 5/2016 |
| WO | WO 2016/079982 A1 | 5/2016 |
| WO | WO 2016/110959 A1 | 7/2016 |

OTHER PUBLICATIONS

Europeam Office Action dated Oct. 19, 2022, in European Patent Application No. 18 789 415.9 filed Oct. 19, 2018, citing document No. 1, therein 7 pages.

Japanese Notice of Reasons for Rejections issued Oct. 11, 2022, in Japanese Patent Application No. 2020-522953 filed Oct. 19, 2018, citing document Nos. 15-17, therein 16 pages (with English Translation).

SPECTACLE LENS COMPRISING AN ACTIVABLE OPTICAL FILTER AND OPTICAL EQUIPMENT COMPRISING SUCH SPECTACLE LENS

CROSS-REFERENCE TO RELATED APPLICATION

The present application is a national stage application of PCT Application No: PCT/EP2018/078723, filed Oct. 19, 2018, which claims priority to European Patent Application No. 17306462.7, filed on Oct. 24, 2017. The benefit of priority is claimed to each of the foregoing, and the entire contents of each of the foregoing are incorporated herein by reference.

FIELD OF THE INVENTION

The invention relates to a spectacle lens intended to be worn by a spectacle wearer comprising an activable optical filter comprising at least an electrochromic device and being configured to be actively switched between at least three configurations.

The invention further relates to an optical equipment comprising such spectacle lens.

BACKGROUND OF THE INVENTION

During life, individuals have their eyes exposed to a strong luminosity, which generates discomfort and glare. Solar lenses or sunglasses are configured to protect the eyes of the wearer of such sunglasses from glare, but are not systematically worn when high luminosity is rare and last a short time, particularly in the winter, fall and spring and thus no protection is provided during that time. Thus, there is a need to provide eyeglasses able to switch from a clear state to a low light transmission state.

It exists photochromic lenses configured to be darken upon exposure to ultraviolet (UV) rays, usually associated with strong natural luminosity. However, such photochromic lenses are passive and cannot be activated on demand by a spectacle wearer or automatically in specific conditions. In addition, such photochromic lenses are usually not activated by artificial light or indoor.

Moreover, it exists activable solar lenses, for instance based on liquid crystals or electrochromic systems. Such activable solar lenses can be switched from a clear state to a low light transmission state so as to protect the eyes of the wearer from strong luminosity.

Nevertheless, it is highly desirable to have an intermediate state in activable solar lenses, said intermediate state being able to filter a maximum of the potentially harmful wavelengths such as high energy blue light, increase contrast or visual comfort in some situation.

It exists passive filters which partially modulate the spectrum of the light received by the eye of the wearer. However, in such passive filters, the spectral filtering functions cannot be activated at the most appropriate times.

Additionally, it exists active glasses comprising pixelated lenses. However, the pixelated lenses of such active glasses are not completely transparent and are difficult to control. Moreover, the pixelated lenses usually comprises a limited number of pixels, which generates dye discontinuities on the active glasses.

Moreover, it could be possible to realize an electrochromic cell of an active optical filter of a spectacle lens having a variable thickness to obtain a gradient of light transmission. However, with this solution, the gradient is permanently defined and does not allow a uniform tint on the entire spectacle lens.

An object of the present invention is to provide a spectacle lens comprising an improved activable optical filter.

SUMMARY OF THE INVENTION

To this end, the invention proposes a spectacle lens intended to be worn by a spectacle wearer, the spectacle lens comprising an activable optical filter, the activable optical filter comprising at least an electrochromic device and being configured to be actively switched between at least three configurations, wherein:
- in the first configuration, the activable optical filter is uniform and light transmitted through the activable optical filter has a chroma $C^*1$ and hue $h°1$,
- in the second configuration, the activable optical filter attenuates selectively light from a localized light source, and light transmitted through the activable optical filter where transmittance is minimum has a chroma $C^*2$ and hue $h°2$,
- in the third configuration, the activable optical filter is uniform and light transmitted through the activable optical filter has a chroma $C^*3$ and hue $h°3$, and
- the chromaticity difference $\Delta Chrom$ between each of the couples $(C^*1, h°1)$, $(C^*2, h°2)$ and $(C^*3, h°3)$ taken two by two is smaller than or equal to 20.

Advantageously, the spectacle lens according to the invention allows obtaining a spectacle lens whose transmittance and/or tint is variable in intensity over all or part of the surface of the spectacle lens. The variation of transmittance and/or tint is advantageously not abrupt so that the spectacle lens does not present transmittance and/or dye discontinuities.

The spectacle lens according to the invention may be switched between three different configurations, each of which offer different light filtering functions.

The first configuration, corresponding to a clear state, provides unaltered color perception.

The second configuration may provide a specific filtering function, such as protection against potentially harmful wavelengths, increasing contrast or visual comfort of the wearer.

The third configuration provides protection against glare.

According to embodiments, the spectacle lens according to the invention may further comprise one or several of the following features according to any possible combination:
- the electrochromic device comprises an electrochromic dye compound and at least two transparent electrodes; and/or
- the electrochromic device is an electrochromic cell; and/or
- at least one transparent electrode has an electrical conductivity, the electrical conductivity varying continuously in at least one direction of the activable optical filter; and/or
- at least one transparent electrode comprises resisting means arranged so as to form at least two areas in the transparent electrode, the electrical conductivity of the transparent electrode varying continuously between the at least two areas; and/or
- the resisting means comprise resistive bridge; and/or
- the resisting means are engraved in the transparent electrode; and/or the resisting means are arranged so as to form three areas in the transparent electrode, the resisting means comprising two engraved portions in the transparent electrode; and/or the at least two transparent electrodes are positioned overlapping, the resisting means comprising the overlap of the transparent electrodes; and/or the resisting means are conformed to provide a transition between the at least two areas; and/or in the first configuration, the activable optical filter has a transmittance T1 greater than or equal to 80% and/or light transmitted through the activable optical filter has chroma C*1 smaller than or equal to 15; and/or the first configuration corresponds to a non-activated configuration of the activable optical filter; and/or in the second configuration, the localized light source is an intense light source; and/or the spectacle lens comprises at least a first zone and a second zone, and in the second configuration, the activable optical filter attenuates light in the first zone more than in the second zone; and/or in the second configuration, the activable optical filter has a lower transmittance in a portion of the surface of the spectacle lens than in another portion of the spectacle lens; and/or in the second configuration, the activable optical filter attenuates light based on the direction of the polarization of the light rays of the localized light source; and/or in the second configuration, the activable optical filter has a gradient of transmittance; and/or in the second configuration, the activable optical filter is anisotropic; and/or the electrochromic device comprises an electrochromic dye compound and an activable polarizing element; and/or the electrochromic device and the activable polarizing element are controlled independently one from the other; and/or in the third configuration, the activable optical filter has a transmittance T3 smaller than or equal to 43%, preferably smaller than or equal to 18%, more preferably smaller than or equal to 8%; and/or the transmittance T2 is equal to the transmittance T3, and the polarizing efficiency PE2 of an activable polarizing element in the second configuration differs by at least 10% from the polarizing efficiency PE3 of an activable polarizing element in the third configuration; and/or the transmittance T2 is equal to the transmittance T3, and the polarizing direction PD2 of an activable polarizing element in second configuration differs by at least 15° from the polarizing direction PD3 of an activable polarizing element in third configuration; and/or the electrochromic dye compound is comprised in the list consisting of viologen, yellow viologen and phenazine; and/or the spectacle lens has an optical function adapted to a wearer. In the third configuration of the activable optical filter, the electrochromic device is preferably activated.

More precisely, the first configuration corresponds preferably to a non-activated state (for both electrochromic and polarizing elements), the second configuration corresponds preferably to an activated state of the activable polarizing element and third configuration corresponds preferably to an activated state of the electrochromic device, eventually superimposed with the activate state of the polarizing element.

The invention further concerns an optical equipment comprising a spectacle lens according to the invention and a control unit configured to control the activable optical filter so as to have the activable optical filter switching between the at least three configurations.

According to embodiments, the optical equipment according to the invention may further comprise one or several of the following features according to any possible combination:

the optical equipment comprises at least one sensor configured to sense a luminosity parameter, and wherein the control unit is configured to control the activable optical filter based on the luminosity parameter provided by the sensor; and/or the sensor is configured to measure the direction of the light rays of a localized light source located in the environment of the wearer when the spectacle wearer wears the spectacle lens.

In the following, CIELab colorimetric model is used. Luminance/Lightness, Chroma C*, Hue h°, red/green position a* and yellow/blue position b* are evaluated within this colorimetric model, under standard D65 illuminant and standard observer convention (angle 10°).

The chromaticity difference ΔChrom between (C*1, h°1) and (C*2, h°2) is defined as the Euclidian distance between colors, regardless of their lightness:

$$\Delta\text{Chrom} = \sqrt{(a*1-a*2)^2 + (b*1-b*2)^2}$$

where a* and b* are the Cartesian color coordinates corresponding to cylindrical C* and h° coordinates of the same color.

This chromaticity difference is not the standard color difference known as Lab ΔE, which includes the lightness component of color. In the invention, lightness may vary significantly in various configurations, and color comparison is limited to chromaticity.

BRIEF DESCRIPTION OF THE DRAWINGS

Other characteristics and advantages of the invention will become more apparent from the claims and from the following description of some embodiments given by way of example without limitation with reference to the drawings, in which:

Figure 1:
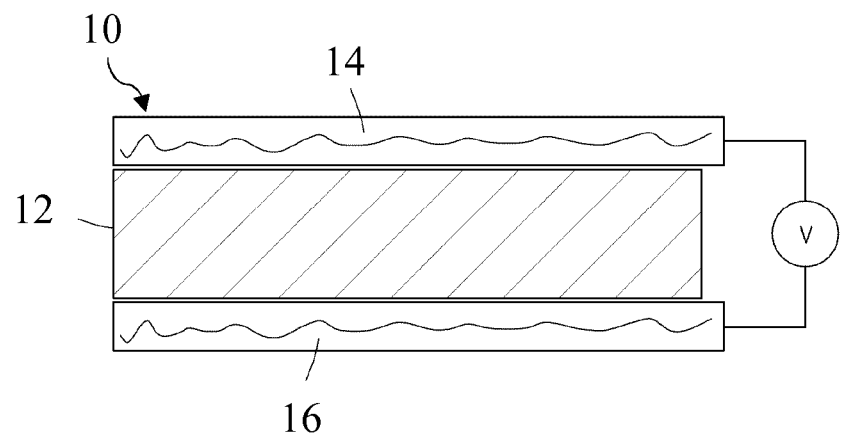
FIG. 1 illustrates an activable optical filter according to an embodiment of the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

The invention relates to a spectacle lens intended to be worn by a spectacle wearer, for example an ophthalmic lens.

The spectacle lens according to the invention may have an optical function adapted to the wearer.

In the sense of the invention, an optical function corresponds to a function providing for each gaze direction the effect of an optical lens on the light ray passing through the optical lens.

The optical function may comprise a dioptric function, a light absorption or a polarizing capability.

The dioptric function corresponds to the optical lens power, namely to the mean power, the astigmatism or the prismatic deviation, as a function of the gaze direction.

The spectacle lens according to the invention may have a specific optical design adapted to the wearer.

The wording "optical design" is a widely used wording known from the man skilled in the art in ophthalmic domain to designate the set of parameters allowing defining a dioptric function of an ophthalmic lens; each ophthalmic lens designer has its own designs, particularly for progressive ophthalmic lenses.

As for an example, a progressive ophthalmic lens "optical design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms.

For example, a progressive lens design comprises a power profile along the main gaze directions, also called meridian line, used by the lens wearer during day life activities, and distributions of powers, for instance mean power or astigmatism, on the sides of the lens, that is to say away from the main gaze directions.

The spectacle lens comprises an activable optical filter being configured to be actively switched between at least three configurations.

Switching may be induced by a control unit.

In the first configuration, the activable optical filter is uniform and light transmitted through the activable optical filter has a chroma $C^*1$ and hue $h°1$.

The first configuration corresponds to a non-activated configuration of the activable optical filter. The effect on the luminosity function in the first configuration is uniform.

In the first configuration, the activable optical filter may have a transmittance T1 greater than or equal to 80%.

In the sense of the invention, the "transmittance" corresponds to the percentage of light transmitted by the activable optical filter over the visible spectrum. In other words, a transmittance of 80% corresponds to 80% of the incident light over the visible spectrum being transmitted through the activable optical filter. Such configuration corresponds to a class 0 lens as defined in the ISO standard ISO8980-3:2003.

The activable optical filter may be configured so that the light transmitted through said activable optical filter has a chroma $C^*1$ smaller than or equal to 15. In other words, the first configuration of the activable optical filter corresponds to a clear state.

Preferably, the first configuration corresponds to a non-activated configuration of the activable optical filter. When the activable optical filter comprises several activable elements, the non-activated state corresponds to all activable elements being non activated.

In the second configuration, the activable optical filter attenuates selectively light from a localized light source, and light transmitted through the activable optical filter where transmittance is minimum has a chroma $C^*2$ and hue $h°2$.

In the sense of the invention, a localized light source means a source that occupies a limited solid angle in the field of view of the wearer. In other words, the area of the spectacle lens through which the wearer receives light is only a part of the spectacle lens. For instance, with a source located above the wearer (lamp above a desk), only the upper part of the spectacle lens will transmit light from said source to wearer's eye. With a source located under the wearer (reflection on water while fishing), mainly the lower part of the spectacle lens will transmit light from said source to wearer's eye.

The localized light source differs from the global light surroundings. In particular, the localized light source may be an intense light source, especially the sun, artificial lightings or reflection of sun or artificial lightings on strongly reflecting surfaces (water, snow, windows, bright surfaces . . . ). The localized light source may also differ by it's colour or another luminosity parameter.

In the sense of the invention, an intense light source is a source 40%, and preferably 50%, more luminous than its environment. An intense light source may be a direct light source, or may correspond to reflected light.

In the sense of the invention, the selective attenuation of the light from a localized light source corresponds a spatial attenuation of the light from the localized light source and/or to a polarization of the light from the localized light source. In other words, the attenuation of the light from the localized light source is spatially selective or selective in polarization. In particular, transmittance of the activable optical filter may be uniform, i.e. the same over the whole surface of the activable optical filter, but still selective for polarized light emitted from a strongly reflecting surface, i.e. a localized light source.

In the second configuration, the activable optical filter may be configured so as to prevent harmful blue light effects on the wearer's retina. To reduce the blue light-induced risk for the retina, the activable optical filter may be configured in the second configuration to reduce the transmission of light between 400 nm and 460 nm, and preferably between 420 nm and 450 nm.

The activable optical filter may be configured so as to, in the second configuration, help improving chronobiology of the wearer. For example, the activable optical filter according to the invention may be configured so that in the second configuration to filter turquoise and blue between 465 nm and 495 nm for activating synchronization of the circadian clock. Such embodiment is particularly advantageous for users suffering from a sleep related disorder such as insomnia, jet lag or for shift workers.

The activable optical filter may be configured so as to, in the second configuration, help increasing contrasts. This may be particularly useful when the wearer is driving or practicing sport. For example, the activable optical lens may be tinted in yellow to increase contrasts. The activable optical filter may be configured, in the second configuration, to filter a range of wavelengths that have a width of at least 20 nm and that is centered on mean wavelengths equal to 475 nm, in order to increase the red/green contrast, or to filter a range of wavelengths that have a width of at least 20 nm and that is centered on mean wavelengths equal to 580 nm, in order to increase the red/green contrast. The activable optical filter may be configured, in the second configuration, to filter a range of wavelengths that has a width of at least 20 nm and that is centered on a mean wavelength equal to 500 nm, in order to increase the blue/green contrast or to filter a range of wavelengths that has a width of at least 20 nm and that is centered on a mean wavelength equal to 600 nm, in order to reduce dazzle.

In the second configuration, the activable optical filter may have a transmittance T2 smaller than or equal to 43%, preferably smaller than or equal to 18%, and more preferably smaller than or equal to 8%.

In the second configuration, the activable optical filter may have a gradient of transmittance. The transmission may be uniform or not uniform through the activable optical filter. When transmission is not uniform through the activable optical filter, the transmittance T2 of the second configuration corresponds to the smallest transmission.

The second configuration light transmittance T2 through the activable optical filter may be reduced by at least 10% as compared to the transmittance T1 of the first configuration, on a range of wavelength selected in the following list of wavelength ranges: from 400 nm to 460 nm, from 420 nm to 450 nm, from 465 nm to 495 nm, from 480 nm to 520 nm, from 460 nm to 520 nm, from 560 nm to 600 nm, from 580 nm to 620 nm and from 530 nm to 650 nm.

In the second configuration, the activable optical filter may be located on the whole optical surface of the spectacle lens or on a part of the optical surface of the spectacle lens.

In particular, for progressive lenses, the activable optical filter may be located on the upper part associated with far vision or the lower part associated with near vision.

In the second configuration, the activable optical filter may have a lower transmittance in a portion of the surface of the spectacle lens than in another portion of the spectacle lens.

The activable optical filter, in the second configuration, may provide a graded tint. When transmission is not uniform through the activable optical filter, the chroma $C^*2$ and hue $h°2$ of light transmitted through the activable optical filter correspond to the darkest tint along the graded tint. The direction of gradient may be vertical or horizontal when the spectacle lens is worn.

In the second configuration, the activable optical filter may attenuate light based on the direction of the polarization of the light rays of the localized light source.

In the second configuration, the activable optical filter may be anisotropic. In other words, optical properties of the activable optical filter are different according to directions in the activable optical filter. For instance, uniaxial materials with birefringent properties are anisotropic: an optical filter activated to be birefringent is an anisotropic activable optical filter. Another example of anistotropic material is a polarizing material which contains a specific direction (obtained either by mechanical stretching or by induced alignment with an external stimulus like electro-magnetic field, e.g. in liquid crystal systems) yielding dichroism. Even if polarizing filters are uniform, i.e. they have the same optical properties on every point of the filter, they are anisotropic. An optical filter activated to be polarizing is an anisotropic activable optical filter.

In the third configuration, the activable optical filter is uniform and light transmitted through the activable optical filter has a chroma $C^*3$ and hue $h°3$.

In the third configuration, vision of the spectacle wearer is protected against glare.

The third configuration may correspond to a dark configuration.

Typically, in the third configuration the activable optical filter has a transmittance T3 smaller than or equal to 43%, i.e. class 2 of the ISO8980-3:2003 standard, for example smaller than or equal to 18%, i.e. class 3 of the ISO8980-3:2003 standard, or for example smaller than or equal to 8%, i.e. class 4 of the ISO8980-3:2003 standard.

The transmittance T3 may be equal to the transmittance T2.

In the third configuration, the activable optical filter may be located on the whole optical surface of the spectacle lens or on a part of the optical surface of the spectacle lens, for instance the upper part associated with far vision or the lower part associated with near vision.

The activable optical filter in the third configuration may provide a graded tint. In this case, the chroma $C^*3$ and hue $h°3$ of light transmitted through the activable optical filter correspond to the darkest tint along the graded tint. The direction of gradient may be vertical or horizontal when the spectacle lens is worn.

The chromaticity difference ΔChrom between each of the couples ($C^*1$, $h°1$), ($C^*2$, $h°2$) and ($C^*3$, $h°3$) taken two by two is smaller than or equal to 20.

In other words, the chromaticity difference ΔChrom between ($C^*1$, $h°1$) and ($C^*2$, $h°2$) is smaller than or equal to 20, the chromaticity difference ΔChrom between ($C^*1$, $h°1$) and ($C^*3$, $h°3$) is smaller than or equal to 20 and the chromaticity difference ΔChrom between ($C^*2$, $h°2$) and ($C^*3$, $h°3$) is smaller than or equal to 20.

In particular, the couples ($C^*1$, $h°1$), ($C^*2$, $h°2$) and ($C^*3$, $h°3$) are different one from the other.

According to an embodiment of the invention, as illustrated on FIG. 1, an activable optical filter 10 of a spectacle lens according to the invention may comprise at least one electrochromic device, for instance an electrochromic cell 12, arranged between two transparent electrodes 14, 16.

Electrochromic devices typically have a structure comprising two transparent outer layers, for example two sheets of organic or mineral glass, two electrically conductive layers, i.e. electrodes, deposited on the inner faces of the outer layers and connected to a power supply, an electrolyte placed between the two electrically conductive layers at the center of said device and an electrochromic compound.

The electrochromic compound is chosen so that it is colored in the reduced state and colorless or weakly colored in the oxidized state, or vice versa.

With such electrochromic devices, it is possible to control state of electrochromic compounds by an electric current, hence its light absorption.

Finally, the light transmission of the electrochromic device is controlled with an electric current.

The wording "activated state" for electrochromic devices means that at least one electrochromic compound comprised in the electrochromic device is colored, thus reducing light transmission through the electrochromic device.

The electrochromic device may comprise an electrochromic dye compound undergoing one optical property change upon application of an electrical field between the two transparent electrodes 14, 16.

The electrochromic dye compound may be viologen, yellow viologen or phenazine. Several electrochromic compounds may be used in combination Depending on the electric field applied, in other words voltage applied, the electrochromic dye compound may be activated.

According to another embodiment of the invention, the activable optical filter 10 may comprise two independent electrochromic devices, for instance two independent electrochromic cells 12, each of the electrochromic device comprising a different electrochromic dye compound.

Each of the two independent electrochromic devices may have a specific color allowing to obtain four different configurations corresponding to both electrochromic cells clear, the first electrochromic cell clear and the second electrochromic cell colored, the first electrochromic cell colored and the second electrochromic cell clear and finally both electrochromic cells colored.

Advantageously, such embodiment allows having four configurations, one of which corresponding to a clear configuration, another to a dark configuration and the last two configurations may correspond to different colors adapted for different functions.

The spectacle lens may comprise at least a first zone and a second zone, in relationship with the localization of the localized light source to be selectively attenuated. In other words, the first zone corresponds to the surface of the lens included in the limited solid angle in the field of view of the wearer where light source is localized. The second zone corresponds to the surface of the lens which doesn't intersect the limited solid angle in the field of view of the wearer where light source is localized.

For instance, with a source located above the wearer (lamp above a desk), the upper part of the spectacle lens which will transmit light from said source to wearer's eye is defined as first zone, whereas the lower part of the spectacle lens is defined as second zone. With a source located under the wearer (reflection on water while fishing), the lower part of the spectacle lens which will transmit light from said source to wearer's eye is defined as first zone, whereas the upper part of the spectacle lens is defined as second zone. According to an embodiment of the invention, in the second configuration, the activable optical filter may attenuate light in the first zone more than in the second zone. In other words, the light is attenuated differently between the different zones of the spectacle lens.

According to an embodiment of the invention, at least one transparent electrode 14, 16, may have a local electrical conductivity. The local electrical conductivity may vary continuously in at least one direction of the activable optical filter. Only one of the transparent electrode 14, 16 may have a uniform electrical conductivity, whereas the other transparent electrode 14, 16 may have a variable electrical conductivity.

At least one transparent electrode 14, 16 may comprise resisting means arranged so as to form at least two areas in the transparent electrode. The electrical conductivity of the transparent electrode 14, 16 may vary continuously between the at least two areas. In other words, a first area of the transparent electrode has a first voltage and a second area of the transparent electrode has a second voltage, the second voltage corresponding to the first voltage reduced by the resisting means.

Figure 2:
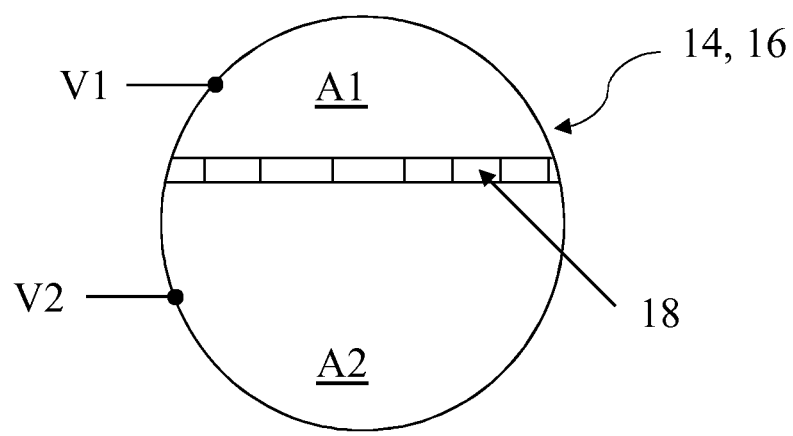
FIG. 2 represents a transparent electrode of an activable optical filter according to an embodiment of the invention.

According to a first sub-embodiment of the invention represented in FIG. 2, the resisting means of the transparent electrode 14, 16 comprise a resistive bridge 18. In particular, only one of the transparent electrode 14, 16 may comprise a resistive bridge 18.

As represented in FIG. 2, the transparent electrode 14, 16 is divided into two areas, a first area A1 and a second area A2, separated with the resistive bridge 18. The areas A1, A2 of the transparent electrode 14, 16 may have the same size or different sizes, and may have the same shape or different shapes.

Of course, the resisting means of the transparent electrode 14, 16 may comprise a plurality of resistive bridges 18 so that the transparent electrode 14, 16 is divided into more than two areas.

In particular, the first area A1 is connected to a first voltage V1 and the second area A2 is connected to a second voltage V2. The first voltage V1 and the second voltage V2 may be equal or different.

For instance, the first area A1 may be connected to a first voltage V1 equal to 0 V, and the second area A2 may be connected to a second voltage V2 equal to 0 V. This configuration of the transparent electrode 14, 16 corresponds to the first configuration of the active optical filter 10 where the active optical filter is uniform and in a clear state.

The first area A1 may be connected to a first voltage V1 equal to 1 V, and the second are A2 may be connected to a second voltage V2 equal to 0.5 V. In this configuration, the activable optical filter attenuates selectively light from a localized light source. This configuration of the transparent electrode 14, 16 corresponds to the second configuration of the active optical filter 10 where the activable optical filter has a gradient of transmittance.

The first area A1 may be connected to a first voltage V1 equal to 1 V, and the second are A2 may be connected to a second voltage V2 equal to 1 V. In this configuration, the activable optical filter is uniform. This configuration of the transparent electrode 14, 16 corresponds to the third configuration of the active optical filter 10 where the active optical filter provide protection against glare.

Advantageously, the gradient of transmittance may be modified depending on the voltage to be applied to the areas of the transparent electrodes.

Figure 3:
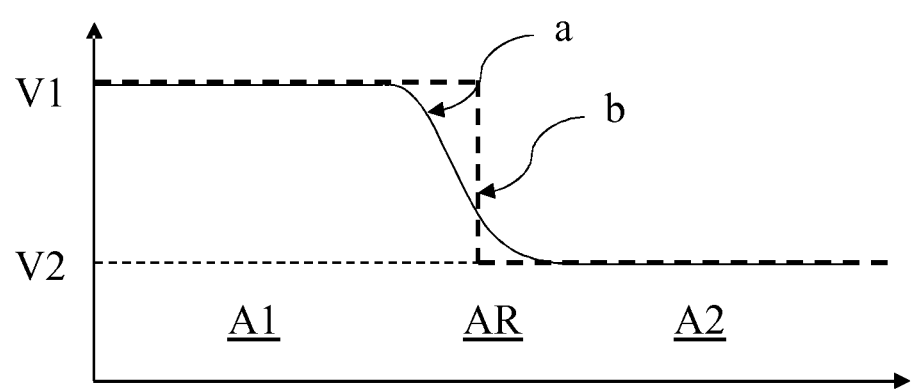
FIG. 3 is a graph of the light transmitted through an activable optical filter according to the invention in function of the voltage applied the activable optical filter.

FIG. 3 represents light transmitted through the activable optical filter 10 in function of the voltage applied to the first area A1 and the second area A2 of the activable optical filter 10. The area AR corresponds to the area of the activable optical filter 10 comprising the resistive bridge 18. The curve a represents the light transmitted through the activable optical filter 10 when the resisting means of the transparent electrode 14, 16 comprise a resistive bridge 18, and the curve b represents the light transmitted through the activable optical filter 10 without resistive bridge 18. As represented in FIG. 3, the curve a presents a slope softer than the slope of the curve b.

Advantageously, the resistive bridge 18 allows having a smooth transition between the first area A1 and the second area A2.

Preferably, the area AR extends over a width between 2 mm to 30 mm of the transparent electrode 14, 16 so as to avoid an abrupt transition between the first area A1 and the second area A2.

Figure 4:
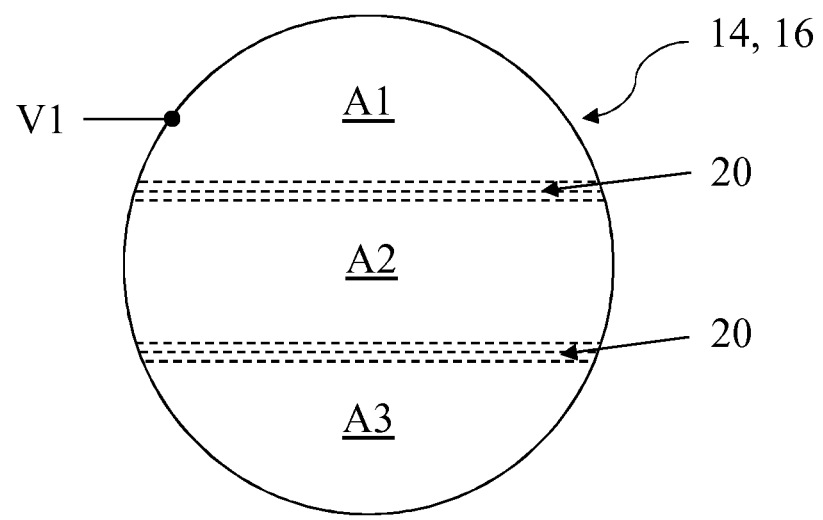
FIGS. 4 and 5 represent transparent electrodes of activable optical filters according to embodiments of the invention, FIGS. 6a and 6b respectively represent an upper and a lower transparent electrode of an activable optical filter according to an embodiment of the invention.

According to a second sub-embodiment of the invention represented in FIG. 4, the resisting means are engraved in at least one of the transparent electrodes 14, 16. The resisting means may correspond to a thinning of the transparent electrode 14, 16. The resisting means allows locally enhancing the electrical conductivity of the transparent electrode 14, 16.

As represented in FIG. 4, the transparent electrode 14, 16 is divided into three areas, a first area A1, a second area A2 and a third area A3. The first area A1 is separated from the second area A2 with engraved resisting means 20. The second area A2 is separated from the third area A3 with engraved resisting means 20. In other words, the second area A2 is arranged between the first area A1 and the third area A3. The areas A1, A2, A3 of the transparent electrode 14, 16 may have the same size or different sizes, and may have the same shape or different shapes.

Of course, the resisting means of the transparent electrode 14, 16 may comprise one or more than two engraved resisting means 20 so that the transparent electrode 14, 16 is divided into a two or more areas.

If the same first voltage V1 is applied to the first, second and third areas A1, A2, A3, the activable optical filter 10 is uniform. For instance, the first area A1 may be connected to a first voltage V1 equal to 0 V. In this configuration, each area A1, A2, A3 has a voltage equal to 0 V. This configuration of the transparent electrode 14, 16 corresponds to the first configuration of the active optical filter 10 where the active optical filter is in a clear state.

The first area A1 may be connected to a first voltage V1 equal to 1 V. The voltage decreases along the transparent electrode 14, 16, and more precisely between the first and the second areas A1, A2 and between the second and third areas A2, A3, because of the engraved resisting means 20. For instance, the second area A2 may have a second voltage equal to 0.8 V and the third area A3 may have a third voltage equal to 0.6 V. In this configuration, the activable optical filter attenuates selectively light from a localized light source. This configuration of the transparent electrode 14, 16 corresponds to the second configuration of the active optical filter 10 where the activable optical filter has a gradient of transmittance.

Figure 5:
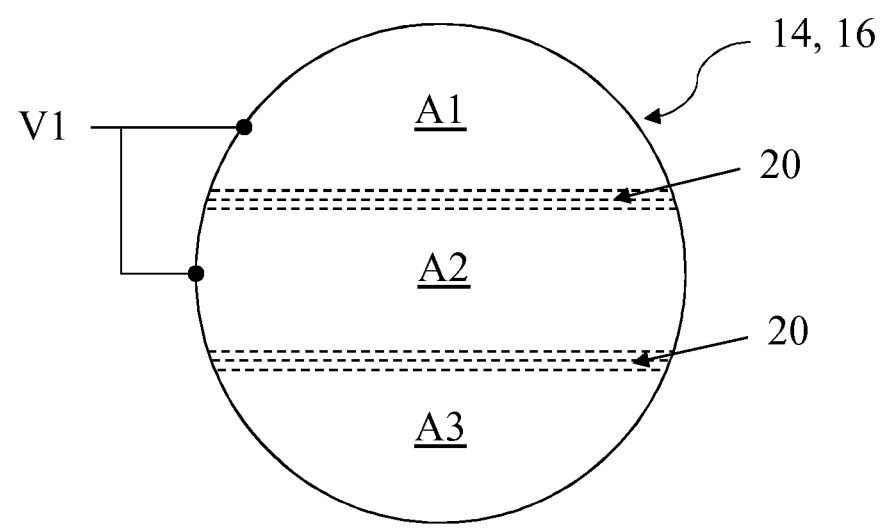

The transparent electrode 14, 16 represented in FIG. 5 differs from the transparent electrode 14 16 represented in FIG. 4 only in that both the first and second areas A1, A2 may be connected to a first voltage V1 equal to 1 V. The voltage decreases along the transparent electrode 14, 16, and more precisely between the second area A2 and the third area A3 because of the engraved resisting means 20. For instance, the third area A3 may have a second voltage equal to 0.8 V.

According to a third sub-embodiment of the invention, the at least two transparent electrodes 14, 16 are positioned overlapping. The resisting means comprise the overlap of the transparent electrodes.

Figure 6A:
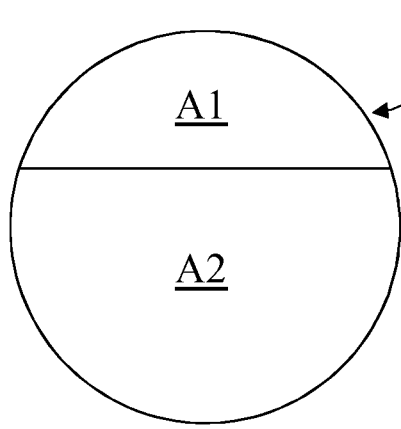
Figure 6B:
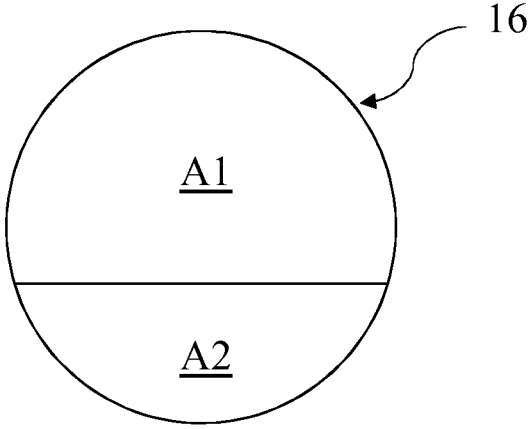

For instance, FIG. 6a represents a first transparent electrode 14, and FIG. 6b represents a second transparent electrode 16. In each transparent electrode 14, 16, the dotted line represents the separation between the first and second areas A1, A2 of each transparent electrode 14, 16.

The first zone A1 of the first transparent electrode 14 is intended to be overlapped to the first zone A1 of the second transparent electrode 16 and is different from the first zone A1 of the second transparent electrode 16, as represented in FIGS. 6a and 6B. The second zone A2 of the second transparent electrode 16 is intended to be overlapped to the second zone A2 of the first transparent electrode 14 and is different from the second zone A2 of the first transparent electrode 14, as represented in FIGS. 6a and 6B.

Figure 7:
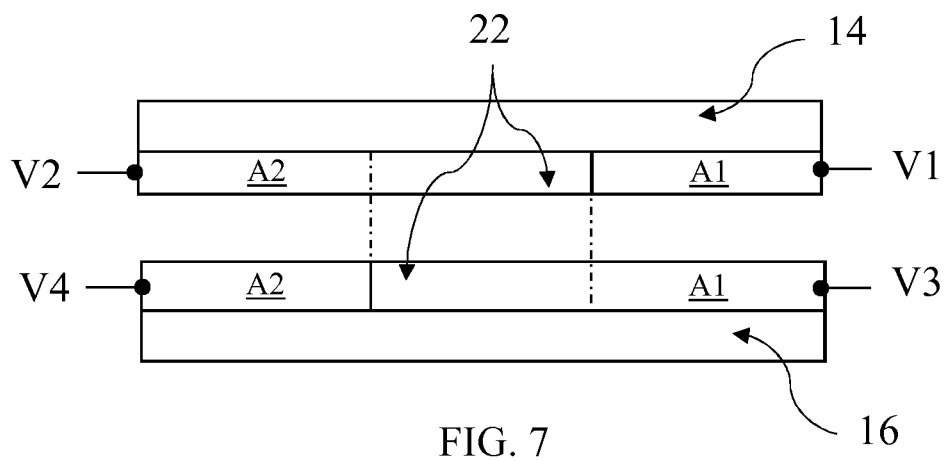
FIG. 7 illustrates an activable optical filter according to an embodiment of the invention.

The third sub-embodiment is represented in FIG. 7. The transparent electrode 14, namely the upper transparent electrode 14, comprises first and second areas A1, A2, and the transparent electrode 16, namely the lower transparent electrode 16, comprises first and second areas A1, A2.

The first area A1 of the first transparent electrode 14 overlaps the first area A1 of the second transparent electrode 16, the second area A2 of the second transparent electrode 16 overlaps the second area A2 of the first transparent electrode 14. A part of the area A1 of the lower transparent electrode 16 and a part of the second area A2 of the upper transparent electrode 14 correspond to the resisting means 22.

The first area A1 of the first transparent electrode 14 may be connected to a first voltage V1, the second area A2 of the first transparent electrode 14 may be connected to a second voltage V2, the first area A1 of the second transparent electrode 16 may be connected to a third voltage V3 and the second area A2 of the second transparent electrode 16 may be connected to a fourth voltage V4.

The first voltage V1, the second voltage V2, the third voltage V3 and the fourth voltage V4 may be equal or different.

If the same first voltage V1, V3 is applied to the first area A1 of the first and second transparent electrodes 14, 16, and the same second voltage V2, V4 is applied to the second area A2 of the first and second transparent electrodes 14, 16, the activable optical filter 10 is uniform. This configuration of the transparent electrode 14, 16 corresponds to the first configuration of the active optical filter 10 where the active optical filter is in a clear state.

The first area A1 of the first transparent electrode 14 may be connected to a first voltage V1 equal to −0.5 V and the second area A2 of the first transparent electrode 14 may be connected to a second voltage V2 equal to 0 V. The first area A1 of the second transparent electrode 16 may be connected to a third voltage V3 equal to 0.5 V and the second area A2 of the second transparent electrode 16 may be connected to a fourth voltage V4 equal to 0 V.

The potential difference between the first area A1 of the first transparent electrode 14 connected to a first voltage V1 and the first area A1 of the second transparent electrode 16 connected to a third voltage V3 is equal to 1 V. The potential difference between the second area A2 of the first transparent electrode 14 connected to a second voltage V2 and the second transparent electrode 16 connected to a fourth voltage V4 is equal to 0 V. The potential difference between the second area A2 of the first transparent electrode 14 connected to a second voltage V2 and the first area A1 of the second transparent electrode 16 connected to a third voltage V3 is equal to 0.5 V. In this configuration, the activable optical filter 10 attenuates selectively light from a localized light source. This configuration of the transparent electrode 14, 16 corresponds to the second configuration of the active optical filter 10 where the activable optical filter has a gradient of transmittance.

Of course, each transparent electrode may comprise more than two areas, and thus the transparent electrode 14, 16 may comprise a plurality of resisting means 22.

In all embodiments, the resisting means may be conformed to provide a transition between the first and second areas A1, A2 of the transparent electrodes 14, 16.

More precisely, in order to preserve a smooth transition of transmittance between the first and second areas A1, A2 of the transparent electrodes 14, 16 in the second configuration of the active optical filter, the edges of the areas of the transparent electrodes 14, 16 may be calculated to extend over a large area, so that the transition of transmittance will occur over this large area. Besides, to limit the possible effects of diffraction, the shape of said edges may be irregular and/or without angular points. Last, the transparent electrodes 14, 16 may overlap so as to combine edges of the first and second areas A1, A2 of the transparent electrodes 14, 16 and result in an area of soft gradient.

Figure 8:
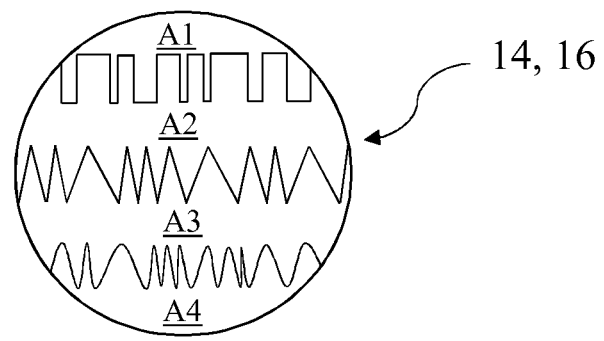
FIG. 8 represents a transparent electrode of an activable optical filter according to an embodiment of the invention.

As represented in FIG. 8, a transparent electrode 14; 16 is represented and comprises four areas A1, A2, A3, A4. The edges of the first and second areas A1, A2 of the transparent electrodes 14, 16 are represented with rectangular type edges, the edges of the second and third areas A2, A3 of the transparent electrodes 14, 16 are represented with triangular type edges, and the edges of the third and fourth areas A3, A4 of the transparent electrodes 14, 16 are represented with curved type edges. Of course, the edges of the first, second, third and fourth areas A1, A2, A3, A4 of the transparent electrodes 14, 16 may be represented with another type edges. The edges of the four areas A1, A2, A3, A4 may be regular, i.e. having a periodic shape, or irregular, i.e. having a non-periodic shape, as represented in FIG. 8. Advantageously, the edges of the four areas A1, A2, A3, A4 present an irregular shape to limit the risks of diffusion of the light between two areas on the spectacle lens.

The frequency, the shape and the amplitude of the edges of the transparent electrodes 14, 16 may be adapted to obtain a smooth gradient between two areas on the spectacle lens.

Figure 9:
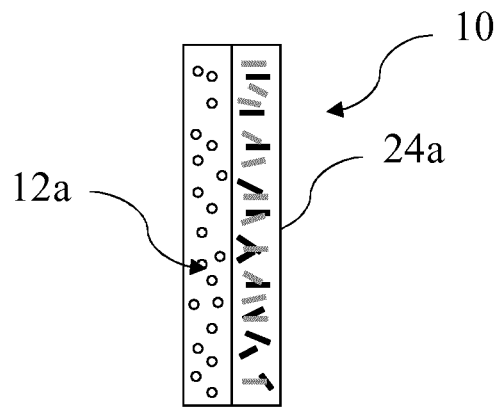
FIGS. 9, 10a, 10b and 11 represent activable optical filters according to different embodiments of the invention.

The electrochromic device may comprise an electrochromic dye compound and an activable polarizing element 24. FIGS. 9 to 11 represent active optical filters comprising both an electrochromic cell 12 and an activable polarizing element 24.

The first configuration of the activable optical filter 10 is represented in FIG. 9. FIG. 9 corresponds to a non-activated state, in which both the electrochromic cell 12*a* and the activable polarizing element 24*a* of the activable optical filter 10 are non-activated and the spectacle lens is clear.

Figure 10A:
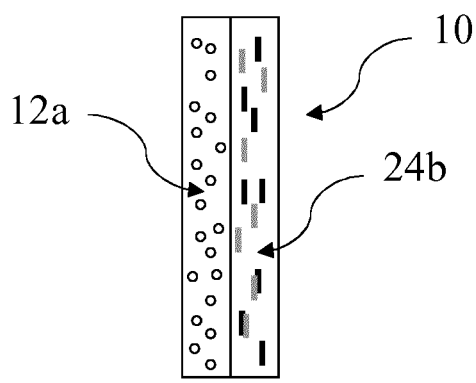
Figure 10B:
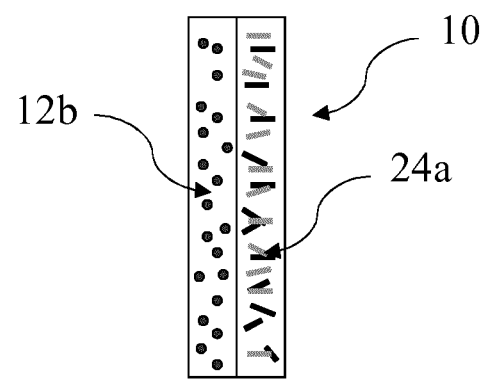
Figure 11:
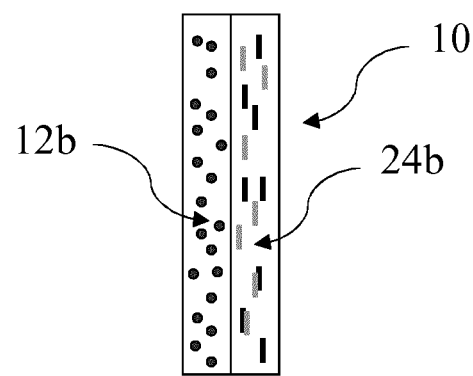

The second configuration of the activable optical filter 10 is represented in FIGS. 10*a* and 10*b*.

In FIG. 10*a*, the electrochromic cell 12*a* is represented in a clear state, and the activable polarizing element 24*b* is represented in a polarizing state. FIG. 10*a* corresponds to a non-activated electrochromic cell and an activated activable polarizing element.

In FIG. 10*b*, the electrochromic cell 12*b* is represented in a dark state, and the activable polarizing element 24*a* is represented in a non polarizing state. FIG. 10*b* corresponds to an activated electrochromic cell and a non-activated activable polarizing element. In the activated state, the electrochromic cell 12 may be isotropic. In other words, the activated electrochromic cell 12 may cut the light whatever the polarization state of light.

The third configuration of the activable optical filter 10 is represented in FIG. 11. FIG. 11 corresponds to an activated state, in which both the electrochromic cell 12*a* and the activable polarizing element 24*a* of the activable optical filter 10 are activated and the spectacle lens is dark.

The polarizing efficiency (PE) of the films is determined by transmission measurements. The transmission and other optical properties are measured using Hunter Lab UltraScan (Registered Trademark) spectrophotometer equipped with a polarizer in the optical path. A transmission spectrum between 400 nm and 750 nm is recorded with the optical axis of a film sample being parallel to the optical axis of the polarizer and then another spectrum is recorded after rotating the polarizer of 90°. Thus the transmission in both situations, denoted by $T_=(\lambda)$ and $T_\perp(\lambda)$ respectively for a given wavelength lambda are determined. The polarizing efficiency, $PE(\lambda)$, is calculated then by the formula:

$$PE(\lambda) = \sqrt{\frac{T_=(\lambda) - T_\perp(\lambda)}{T_=(\lambda) + T_\perp(\lambda)}}$$

The polarizing direction of the activable polarizing filter is the axis for which light polarized in the direction of said axis is not transmitted. To the contrary, light polarized in the direction perpendicular to said axis is totally transmitted.

According to the polarization efficiency of the activable polarizing element 24, the dark state of the electrochromic device may be increased. For instance, if polarization efficiency of activable polarizing element 24 is 100%, half of light will be cut and the resulting transmission will be halved.

In particular, the activable polarizing element 24 may be configured to obtain a non polarizing state, for instance when the wearer is indoor, or in a tunnel, and that can turn to a polarized or/and darker state considering the situation of the wearer, the environment of the wearer, the behaviour of the wearer or the activity of the wearer.

According to an embodiment of the invention, not illustrated, the activable polarizing element of the activable optical filter comprises a transparent liquid crystal solution.

In the clear non-activated state, the activable polarizing element may correspond to dichroic dyes mixed in a liquid crystal solution. Once incorporated in the liquid crystal solution, the dichroic dyes may provide an absorbing effect.

When applying an electrical field between the two transparent electrodes 14, 16, the orientation of the liquid crystals changes and allows, for example, to switch from a state where the liquid crystals reflect the desired wavelengths to a state where the liquid crystals are oriented differently and do not reflect anymore, or are oriented identically and increase the light reflection.

In other words, in an activated state under an electrical field, the liquid crystal solution is oriented and defines an interferential system which provides reflection of light for specific wavelengths. In the same time, dichroic dyes are oriented by the liquid crystal, resulting in an increased absorption of some polarized light. This activable element shows simultaneously polarizing effect and light filtering.

The electrochromic cell 12 and the activable polarizing element 24 may be controlled independently one from the other. For instance, at a constant global transmission of the electrochromic cell 12, the polarization rate or the transmission level of the electrochromic cell 12 may be adjusted. For example, for a given global transmission of the electrochromic cell 12, it is possible to increase the contribution of the activable polarizing element 24 when the light of the environment is highly polarized, and vice versa. The polarization rate of the environment may be determined with a sensor configured to sense direction of polarization of the light or difference of intensity in two polarization directions, for instance integrated in the frame of the spectacle lens.

The polarizing efficiency PE2 of the activable polarizing element 24 in the second configuration may differ by at least 10% from the polarizing efficiency PE3 of the activable polarizing element 24 in the third configuration.

The polarizing direction PD2 of the activable polarizing element 24 in second configuration may differ by at least 15° from the polarizing direction PD3 of the activable polarizing element 24 in third configuration.

The invention relates to an optical equipment comprising a spectacle lens as described previously and a control unit.

The control unit is configured to control the activable optical filter so as to have the activable optical filter switching between the at least three configurations.

The switch between the at least three configurations may be done manually by the wearer of the optical equipment.

The optical equipment may comprise at least one sensor configured to sense a luminosity parameter. The control unit may be configured to control the activable optical filter based on the luminosity parameter provided by the sensor.

The sensor may be configured to sense the direction of the light rays of a localized light source located in the environment of the wearer when the spectacle wearer worn the spectacle lens.

The invention has been described above with the aid of embodiments without limitation of the general inventive concept. Moreover, the embodiments of the invention may be combined without any restriction.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A spectacle lens intended to be worn by a spectacle wearer, the spectacle lens comprising:
    an activable optical filter comprising at least an electrochromic device and configured to be actively switched between at least three configurations;
    a first zone; and
    a second zone, wherein
    at least one transparent electrode has an electrical conductivity, the electrical conductivity varying continuously in at least one direction of the activable optical filter,
    in a first configuration, the activable optical filter is uniform and light transmitted through the activable optical filter has a chroma C*1 and hue h°1,
    in a second configuration, the activable optical filter attenuates selectively light from a localized light source, and light transmitted through the activable optical filter where transmittance is minimum has a chroma C*2 and hue h°2,
    in the second configuration, the activable optical filter attenuates light in the first zone more than in the second zone,
    in a third configuration, the activable optical filter is uniform and light transmitted through the activable optical filter has a chroma C*3 and hue h°3,
    a chromaticity difference ΔChrom between each of couples (C*1, h°1), (C*2, h°2) and (C*3, h°3) taken two by two is smaller than or equal to 20, and
    $\Delta\text{Chrom}=\sqrt{((a^{*}1-a^{*}2)^{2}+(b^{*}1-b^{*}2)^{2})}$, where a* and b* are Cartesian color coordinates corresponding to cylindrical Chroma C* and Hue h° coordinates of a same color.

2. The spectacle lens according to claim 1, wherein the electrochromic device comprises an electrochromic dye compound and at least two transparent electrodes.

3. The spectacle lens according to claim 1, wherein at least one transparent electrode comprises a resisting device arranged so as to form at least two areas in the transparent electrode, the electrical conductivity of the transparent electrode varying continuously between the at least two areas.

4. The spectacle lens according to claim 3, wherein the resisting device comprises a resistive bridge.

5. The spectacle lens according to claim 3, wherein the resisting device is engraved in the transparent electrode.

6. The spectacle lens according to claim 3, wherein the resisting device is arranged so as to form three areas in the transparent electrode, the resisting device comprising two engraved portions in the transparent electrode.

7. The spectacle lens according to claim 3, wherein at least two transparent electrodes are positioned overlapping, the resisting device comprising the overlap of the transparent electrodes.

8. The spectacle lens according to claim 3, wherein the resisting device is conformed to provide a transition between the at least two areas.

9. The spectacle lens according to claim 1, wherein in the second configuration, the activable optical filter is anisotropic.

10. The spectacle lens according to claim 9, wherein the electrochromic device comprises an electrochromic dye compound and an activable polarizing element.

11. The spectacle lens according to claim 10, wherein the electrochromic device and the activable polarizing element are controlled independently one from the other.

12. An optical equipment comprising:
    the spectacle lens according to claim 1; and
    a controller configured to control the activable optical filter so as to have the activable optical filter switching between the at least three configurations.

13. The optical equipment according to claim 12, further comprising at least one sensor configured to sense a luminosity parameter, and wherein the controller is configured to control the activable optical filter based on the luminosity parameter provided by the at least one sensor.

* * * * *